United States Patent [19]

Weitz et al.

[11] Patent Number: 4,628,747
[45] Date of Patent: Dec. 16, 1986

[54] METHOD AND APPARATUS FOR MEASURING TENSION

[76] Inventors: Gene C. Weitz, 4246 Bridgewood Ter., Vadnais Heights, Minn. 55110; C. Robert Canavan, 700 Del Oro Dr., Safety Harbor, Fla. 33572

[21] Appl. No.: 663,665

[22] Filed: Oct. 22, 1984

[51] Int. Cl.⁴ .............................................. G01L 5/10
[52] U.S. Cl. ............................ 73/862.44; 73/862.53; 254/134.3 FT
[58] Field of Search .......... 73/862.39, 862.42–862.44, 73/862.56, 862.57, 862.53; 254/134.3 FT, 270

[56] References Cited

U.S. PATENT DOCUMENTS

| | | |
|---|---|---|
| 1,141,562 | 6/1915 | Law . |
| 2,159,969 | 5/1939 | Furst . |
| 2,414,161 | 1/1947 | Moore .......................... 73/862.65 X |
| 2,596,456 | 5/1952 | Williams . |
| 2,673,464 | 3/1954 | Zublin . |
| 3,410,246 | 11/1968 | Lowe . |
| 3,683,355 | 8/1972 | Collins . |
| 3,913,396 | 10/1975 | Elliot . |
| 3,978,722 | 9/1976 | Glotzl et al. . |
| 4,039,084 | 8/1977 | Shinohara et al. ........... 73/862.56 X |
| 4,160,325 | 7/1979 | DeNicola . |
| 4,167,869 | 9/1979 | Gikas . |
| 4,307,608 | 12/1981 | Useldinger et al. ......... 73/862.53 X |
| 4,458,880 | 7/1984 | Conti ............................ 73/862.44 X |
| 4,461,459 | 7/1984 | Conti ............................ 73/862.44 X |
| 4,501,148 | 2/1985 | Nicholas et al. ............. 73/862.53 X |
| 4,509,376 | 4/1985 | Thomasson ..................... 73/862.56 |

FOREIGN PATENT DOCUMENTS 2900770 7/1980 Fed. Rep. of Germany ... 73/862.39

Primary Examiner—Charles A. Ruehl
Attorney, Agent, or Firm—Lawrence M. Nawrocki

[57] ABSTRACT

A method and apparatus for accurately measuring the tension exerted upon a fiber optic cable (10) during its installation into a conduit (20) and preserving the reading of maximum tension for future reference. The apparatus (22) includes first and second member portions (26, 38) which are secured relative to one another by a bridge member (36). Bridge (36) has mounted thereon a deformable, electrically resistive element (44) through which a current flows and varies in response to the varying resistivity caused by the element's deformation. Current flow is, in turn, channeled through a microprocessor (48) which converts variations in current flow to equivalent readings of tension which are being applied to the cable (10). The tension readings are displayed by appropriate means.

6 Claims, 4 Drawing Figures

METHOD AND APPARATUS FOR MEASURING TENSION

TECHNICAL FIELD

The present invention relates to the field of measuring and recording tension exerted upon a filamentlike coil being pulled through a conduit. More specifically, the present invention relates to the measuring and recording of the maximum tension exerted upon fiber optic cable as it is being installed in a conduit by being pulled therethrough. The invention comprises both a method and an apparatus for effecting this function.

BACKGROUND OF THE INVENTION

The relatively new technology of fiber optic cable has provided society with capabilities not previously envisioned. Fiber optic cable has numerous uses. In certain applications, it can be used for directing light along tortuous transmission paths. Consequently, it can be used in structures as diverse as surgeon's headlamps and devises for testing integrated circuit chip carriers wherein it is necessary to sense the presence of a device to be tested at a particular location. The fiber optic cable, because of its ability to transmit light in paths other than straight, can be used to ascertain whether a device is or is not in a particular location. If the device is sensed as being in a particular location because of a break in a light circuit transmitted along fiber optic cable and across a gap occupied by the device, certain functions can be performed.

Other more sophisticated applications exist for the use of fiber optic cable. A significant use to which it can be put is the transmission of telecommunications signals. The unique characteristics of fiber optic cable enable it to be used in such an application.

Similarily, it can be used to perform various telemetry-like functions. Such functions can include monitoring of voltage in power transformers and the transmission of information with regard to such voltages, etc.

With these more sophisticated applications, frequently significant lengths of such cable must be laid. Typically, such lengths of cable are threaded through a conducting conduit lubricated to facilitate transmission of the cable along the conduit length. In installing the cable in place in the conduit, a lead wire is used to pull the cable through the conduit.

Because the properties of the cable can be distorted if it is subjected to inordinate amounts of force during installation, it is important to know whether, while the cable is pulled through the conduit, it is subjected to forces in excess of acceptable limits.

To date, such tensions have been measured by use of an instrument secured to one end of a lead wire, while the other end of the lead wire was secured to the cable head by means of a swivel joint. The lead wire, in turn, is fed about a capstan, and the capstan transforms its rotational motion into linear movement of the cable along the axis of elongation of the conduit into which it is being pulled. By use of such an arrangement, the tension is actually being measured in a direction from the capstan different than the direction from which the cable is approaching. As a result of the looping of the lead wire about the capstan, the reading measured by a tensiometer does not accurately reflect the tension to which the cable was being subjected. Because much of the tensional force is absorbed as a result of the friction between the lead wire and the capstan outersurface, the reading generated by the tensiometer will be less then the actual tension applied to the cable.

The maximum acceptable tension will vary depending upon the size of the particular fiber optic cable being pulled through the conduit. For example, a standard size might function to effect its designed purpose if the maximum tension exerted upon it were no greater than, for example, 800 pounds. In order to provide a margin for error, it might be arbitrarily determined that any reading of the tensiometer indicating a tension in excess of 600 pounds would reflect a situation indicative of cable potentially damaged and not able to perform its function. With measurements performed in accordance with prior art operations, the tensiometer might well read a tension of 500 pounds when, in fact, the maximum tension to which the cable was subjected exceeded 800 pounds.

Larger cable may well be deemed to have received no damage if it does not have a tension greater than 1000 pounds exerted upon it. With such cable, similar circumstances can be envisioned wherein the actual recording by the tensiometer would be less than 1000 pounds while the actual tension to which the cable was subjected might have exceeded, for example, 1200 pounds.

Another problem existent in the prior art is one wherein, although the tensiometer used to measure the tension applied to the cable provides a reading as to tension at any particular time, there is no preservation of the maximum tension reading. In the particular application of pulling fiber optic cable through a conduit, the only truly significant reading is the maximum tension to which the cable has been subjected. It is, of course, difficult to constantly view the representation of the tension being sensed because the tensiometer is moving as the cable is drawn through the conduit. More importantly, however, it is not practicable to even try to continuously observe the tensiometer.

It is to these problems in the prior art, therefore, that the present invention is directed. The present invention comprises a method of accurately ascertaining the maximum tension to which the cable being drawn through a conduit is subjected and for preserving that reading for later consideration. It also includes an apparatus for accomplishing these goals.

SUMMARY OF THE INVENTION

The present invention is a method by which fiber optic cable can be put into place in a conduit in which it is to be positioned and by which the maximum tension to which the cable was subjected during the evolution of pulling the cable through the conduit can be measured and preserved. The present method involves utilization of an appropriate tension measuring instrument which can be affixed, at an axial end thereof, to the cable head (that is, the leading end of the cable as it is drawn through the conduit). A lead line is secured to an opposite end of the tension measuring instrument. The lead line is, in turn, lead to a capstan capable of being driven in a rotating fashion about an axis thereof. The lead line is brought into engagement with a surface of the capstan rotating about the axis of rotation. Such engagement can be partial wrapping of the lead line about the capstan surface or coiling the lead line a number of times about the capstan's outer surface. The capstan, thereafter, is operated to draw the lead line, and, in turn, the cable in a desired direction. The cable is, thereby, drawn through the conduit. The tension to which the cable is subjected is accurately measured at the cable head because of the positioning of the tension measuring instrument.

The method can be practiced whereby means are provided to record and preserve the maximum tension to which the cable was subjected during the pulling evolution. Regardless of whether the readings recorded are contemporary readings or merely the maximum reading observed over a period of time, the method can include a step of providing a swivel link in the train of components secured together. Provision of such a structure can be made between the cable head and the tension measuring instrument. Damage to the fiber optic cable which might be occasioned by twisting can, thereby, be prevented.

The invention also includes an apparatus embodiment. The apparatus comprises a tension measuring instrument capable of being used in the method embodiment. The instrument includes first and second structural members intended to be secured, at respective ends, thereof, to the cable head, or swivel, and pull line respectively. The first and second members are bridged by a member fixedly secured, at opposite ends of elongation thereof, to the first and second structural members of the measuring devise. The member bridging the first and second structural members carries an electronically resistive element which is so disposed with regard to the bridging member so that, as tension is exerted in opposite directions upon the tension measuring instrument by the fiber optic cable and pull line, the resistive element is deformed. A current is passed through the resistive element, and the alteration in current flow in response to the changing resistivity of the element because of these opposing forces serves to indicate the amount of tension to which the cable is subjected. Means are provided within the instrument for determining the measure of change in current flow and translating this change into a tension reading.

In a preferred embodiment of the instrument, the first structural member thereof is formed having a wall defining a cavity therein. A portion of the wall in a direction of the second member has an aperture formed therein. The element interconnecting the first and second structural members can extend through this aperture and the electrically resistive element carried thereby can be disposed within this cavity. The element and its related wiring can, thereby, be protected against damage.

A microprocessor can be positioned within the cavity and be electrically connected to the resistive element so that change in current flow and, concurrently, resistivity of the element can be measured. The microprocessor also serves to convert these reading changes to corresponding tension levels exerted upon the fiber optic cable.

The instrument can further include a digital display powered by the microprocessor unit for visually representing the tension to which the fiber optic cable is being subjected. The microprocessor can, if desired, be programmed so that the digital display will continuously register changing tension readings while tension is increasing, but wherein, as tension to which the cable is subjected subsides, the highest reading previously registered will continue to be displayed. The reading of maximum tension to which the cable has been subjected can, thereby, be preserved.

In order to insure that the instrument is functional over repetitive uses, reset means can be provided. Such means enable the digital display to be returned to a "0" reading.

The present invention is, thus, an improved method and apparatus for measuring tension, and particularly for measuring tension to which a fiber optic cable is subjected while it is being pulled into place in a conduit in which it is to reside. More specific features and advantages obtained in view of those features will become apparent with reference to the DETAILED DESCRIPTION OF THE INVENTION, claims, and accompanying drawings.

DETAILED DESCRIPTION OF THE INVENTION

Figure 1:
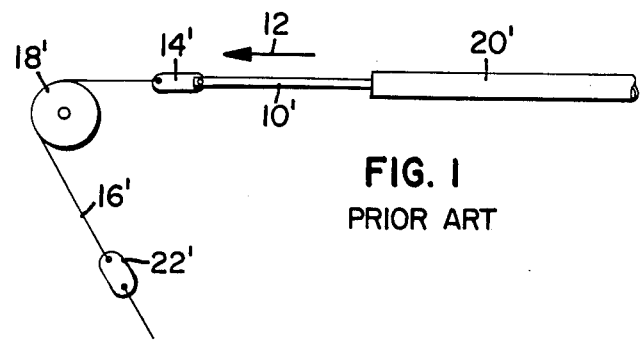
FIG. 1 is a top plan view showing the relationship of various components as they are arranged when practicing methods for drawing a fiber optic cable through a conduit in accordance with the prior art.

Referring now to the drawings wherein like reference numerals denote like elements throughout the several views, FIG. 1 illustrates a manner in which the pulling of a fiber optic cable 10' through a conduit is practiced in the prior art. In FIG. 1, the arrow 12 illustrates the direction in which the cable 10' is pulled. A swivel 14' can be used to allow the pull line 16' to rotate about the axis of movement of the cable 10', relative to the cable.

The pull line 16' is, in turn, engaged with an outer cylindrical surface of a capstan 18' in order to assist in drawing the fiber optic cable 10' through a conduit 20'. If necessary, the pull line 16' can be coiled a number of times about the capstan 18'.

A device 22' is inserted into the pull line assembly in a direction from the capstan 18' different than that from which the cable 10' is approaching. As discussed in the BACKGROUND OF THE INVENTION portion of this document, frictional forces at the capstan 18' will diminish a reading of tension sensed by the tension measuring device 22'.

Figure 2:
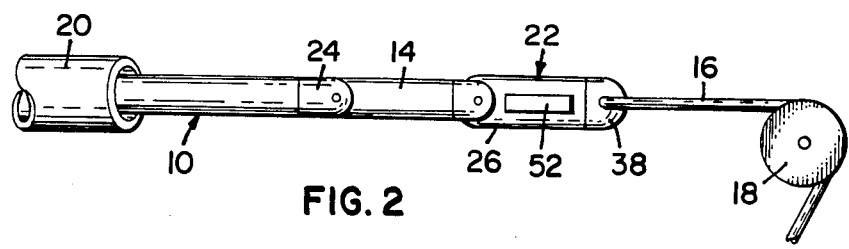
FIG. 2 is a view illustrating the arrangement of various components in accordance with the practice of the present method invention.

FIG. 2 illustrates a method of "pulling" fiber optic cable in accordance with the present invention. The fiber optic cable 10 is drawn through the conduit 20 with a tension sensing and measuring instrument 22 virtually immediately at the fiber optic cable head 24. As shown in FIG. 2, the tension measuring instrument 22 is separated from the cable head 24 only by a swivel joint 14 in order to permit rotation of the cable 10 relative to the instrument 22. The swivel joint 14, here, serves the same function as does the swivel joint 14' used in the prior art method.

A pull line 16 is, in turn, attached to the other end of the tension measuring instrument 22 and, thereafter, run to a capstan 18 as is done in the prior art. Because of the positioning of the instrument 22, however, accurate readings of the tension to which the fiber optic cable 10 is subjected during the pulling evolution are obtained.

Figure 3:
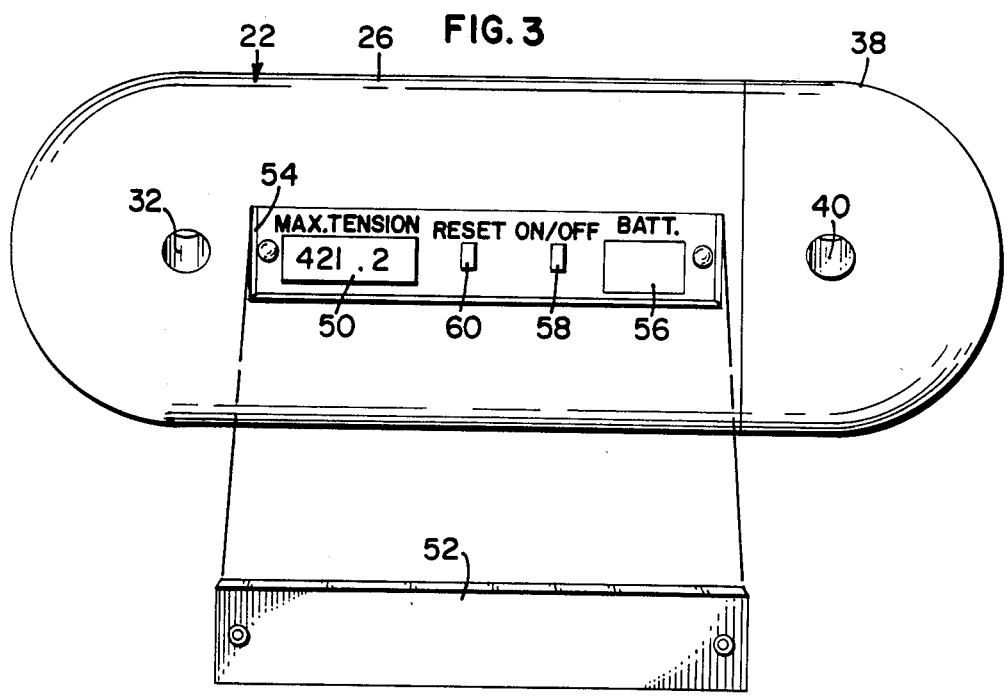
FIG. 3 is a side elevational view of a tension measuring instrument in accordance with a present apparatus invention and with an access plate removed to illustrate various inner components of the instrument.
Figure 4:
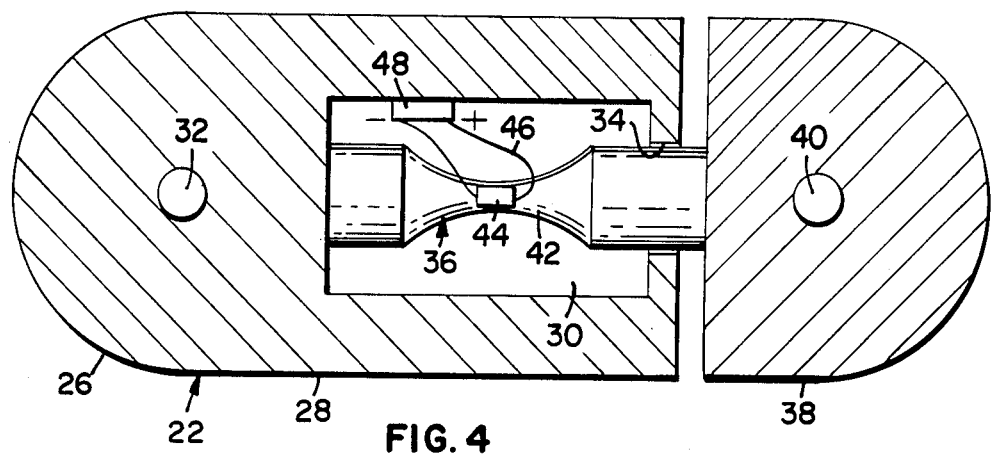
FIG. 4 is a sectional view of the instrument illustrated in FIG. 3.

FIGS. 3 and 4 illustrate a tension measuring instrument 22 for use in the practice of the method hereinbefore described. Referring first to FIG. 4, an instrument 22 in accordance with the present invention is illustrated in cross section. A first portion 26 of the instrument 22 is illustrated as having a wall 28 defining a generally central cavity 30. At an end of the first portion opposite the cavity 30 is an eye 32 by means of which the first portion 26 can be secured to either the cable head 24 or a swivel link 14.

The end of the first portion 26 opposite the eye 32 has an aperture 34 formed therein which provides communication between the cavity 30 and the outside of the first portion 26. A bridge 36 extends through this aperture 34 and is secured to an inner portion of the wall 28 defining the cavity 30, an end of the bridge 36 opposite from the end by which it is secured to the cavity inner wall 28 protruding through the aperture 34.

A second instrument portion 38 is secured to this distal end of the bridge 36. The second instrument portion 38, like the first portion 26, can include an eye 40 by which the second end of the instrument 22 can be attached to a pull line 16.

As seen in FIG. 4, the bridge 36 includes a narrowed neck portion 42 substantially intermediate its opposite ends. It will be understood, however, that it is not essential that this narrowing portion 42 be particularly centrally located in the bridge member 36.

A deformable, electrically resistive element 44 forms at least a portion of the narrow neck 42 of the bridge member 36. The element 44 has characteristics of resistivity which vary as it is deformed.

As can be seen, as a force is applied leftwardly to the first structural member 26 of the instrument 22 and a force is applied rightwardly to the second structural member 38 of the instrument 22, a tensile effect will be applied to the narrowing neck portion 42, and the electrically resistive element 44 will be deformed. As deformation occurs, a current running through a wire 46 will vary in response to the resistivity variation. A microprocessor 48 carried by the measuring instrument 22 will be inputted by the current. The microprocessor 48 is programmed to sense these current variations and to convert variations sensed into a value of tension being applied to the fiber optic cable 10.

The microprocessor 48, in turn, transmits a signal to a visual representation in order to display the tension sensed. The microprocessor 48 can be programmed so that, as the tension builds, the representation will continue to reflect the actual tension applied to the fiber optic cable 10. Programming can be such, however, that, as tension decreases, the maximum reading will be retained on the display.

As seen in FIG. 3, the visual display means can take the form of a digital display 50. An access plate 52 can be put in place over a recess 54 in which the digital display 50 is mounted. The display can, thereby, be protected. The recess 54 can, further, house a battery 56 for providing electrical power source means for the microprocessor 48 and the provision of current to the deformable, electrically resistive element 44. The recess 54 can also house an "on/off" switch 58 and a reset button 60 for zeroing the digital display 50.

Numerous characteristics and advantages of the present invention have been set forth in the foregoing description. It will be understood, however, that this disclosure is, in many respects, only illustrative. Changes may be made in details, particularily in matters of shape, size, and arrangement of parts without exceeding the scope of the invention. The invention's scope is, of course, defined in the language in which the appended claims are expressed.

What is claimed is:

1. An instrument for measuring the tension exerted upon a fiber optic cable having a cable head, during installation of the cable in a conduit in which it is to reside, comprising:
   (a) a first instrument member securable to the cable head;
   (b) a second instrument member securable to a pull line, coilable about a rotatable capstan, for drawing the cable through the conduit;
   (c) a bridge member spanning said first and second instrument members and including a deformable, electrically resistive element, wherein resistivity of said element varies as it deforms in response to pressure exerted on the bridge member by the drawing of the pull line, in one direction, and the resistance of the fiber optic cable in an opposite direction;
   (d) means for ascertaining measured changes in resistivity of said element resulting from deformation thereof, and converting said measurements to corresponding tension readings; and
   (e) means for preserving the maximum tension reading registered.

2. An instrument in accordance with claim 1 wherein said first instrument member has a wall defining a cavity within said first member, and wherein said wall has, at one end thereof, means for securing said member to the cable head and, at an opposite end thereof, an aperture.

3. An instrument in accordance with claim 2 wherein said bridge member extends through said aperture and is secured, at a first end thereof, to said wall of said first instrument member within said cavity and, at a second end thereof, to said second instrument member.

4. An instrument in accordance with claim 3 wherein said bridge member comprises a rod-like part having a narrowed neck portion within said cavity and wherein said electrically resistive element is posited at said narrowed neck portion.

5. An instrument in accordance with claim 1 wherein said ascertaining and converting means comprises microprocessor means in electrical communication with said electrically resistive element.

6. An instrument in accordance with claim 5 further comprising digital display means, run by said microprocessor means, for visually identifying tension readings sensed.

* * * * *